United States Patent [19]
Johnson

[11] 3,754,856
[45] Aug. 28, 1973

[54] PRODUCING A DYED PROPYLENE POLYMERIC FABRIC BY INCORPORATING A PLURALITY OF FIBERS CONTAINING DYE RECEPTORS THEREIN

[75] Inventor: Robert F. Johnson, Lubbock, Tex.

[73] Assignee: Phillips Petroleum Company, Bartlesville, Okla.

[22] Filed: May 5, 1969

[21] Appl. No.: 822,054

[52] U.S. Cl............................. 8/15, 8/168, 8/171, 260/41 C
[51] Int. Cl............................................. D06p 1/68
[58] Field of Search .................... 260/41; 8/15, 168, 8/171

[56] References Cited
UNITED STATES PATENTS
3,099,515  7/1963  Goodings et al.................... 8/171 X 3,310,575  3/1967  Spivack.............................. 8/100 X
3,330,893  7/1967  Hay et al. .......................... 8/171 X
3,419,342  12/1968  Matlack............................. 8/163 X FOREIGN PATENTS OR APPLICATIONS
1,116,698  6/1968  Great Britain OTHER PUBLICATIONS
Diserens, Chem. Tech. of Dye & Print., 1948, p. 410, 424–426.

Primary Examiner—George F. Lesmes
Assistant Examiner—Patricia C. Ives
Attorney—Young and Quigg

[57] ABSTRACT

A method of producing dyed polymeric materials by incorporating in a polymer fabric a plurality of fibres, each of which contain a dye receptor or a combination of dye receptors.

7 Claims, No Drawings

PRODUCING A DYED PROPYLENE POLYMERIC FABRIC BY INCORPORATING A PLURALITY OF FIBERS CONTAINING DYE RECEPTORS THEREIN

This invention relates to color impartation to preformed polyolefin materials.

In one of its more specific aspects, this invention relates to adjusting the dye receptivity of preformed filamentous polyolefin materials, such as polypropylene.

The difficulty of imparting color to unmodified polypropylene is well known. Accordingly, methods have been employed for incorporating into the polypropylene system materials which increase its dye receptivity. Such methods include incorporation of compounds to produce a polymer containing a chelatable or metallizable dye receptor or to produce a polymer containing a disperse dye receptor. The method of this invention provides a novel method for producing cross-dyeable polypropylene fabric by treatment of the polypropylene prior to melt extrusion.

According to the method of this invention there is provided a process for producing a dyed polymeric fabric by fabricating said fabric from a plurality of fibres each of the fibres having incorporated various amounts of both a metallizable disperse dye receptor and a disperse dye receptor and dyeing the fabric with a mixture of dyes of the two types.

In one embodiment of this invention, fibres incorporating the additives in their individual forms are dyed.

In another embodiment of this invention, fibres incorporating combinations of the individual additives are dyed.

The method of this invention provides a method of producing fibres or fabrics possessing all colors and shades, depending upon the characteristics of the additives incorporated in the polypropylene and their percentages incorporated. Accordingly, the method of this invention provides a process for producing both multi-tone and multi-color effects in the same fabric.

The method of this invention is applicable to polymeric compositions compatible with additives which affect their coloration. The method is of particular value where the polymer is polypropylene, especially that crystalline form used to form fibres. Accordingly, the invention is discussed in terms of polypropylene without intending to limit the invention thereto. Other polyolefins such as polyethylene, poly(4-methylpentene-1), poly(butene-1), and the like can be used.

The invention is applicable to such polymeric compositions in the form of fibres, filaments, yarns, fabrics and textile articles into which the after-discussed dye receptors can be incorporated.

The additives which are incorporated in the polymeric form are of two kinds: one is a dye receptor for disperse dyes; the other is an organometallic dye receptor for chelatable or metallizable disperse dyes. The former imparts to the polymeric form retention of a disperse dye; the latter imparts to the polymeric form retention of a metallizable disperse dye.

The disperse dye receptor is of the conventionally known types such as poly(ethylene terephthalate), poly[1,3-di(4-piperidyl)propane adipamide], alkylated poly(vinyl pyrrolidones), and the like. Exemplary of the materials that can be used are those disclosed in British Pat. No. 1,054,303, and in U.S. Pat. Nos. 3,312,755 and 3,330,893, and the like. Similarly, the organometallic metallizable disperse dye receptor is of the conventionally known types, including organonickel compounds such as those disclosed in U.S. Pat. Nos. 3,310,575, 3,419,342, and 3,395,112, and the like. The dyes employable will be any one of the well known dyes, which are operable with the aforementioned additives in any conventional dyeing method.

Incorporating the additives in the polymer can be accomplished in a number of methods. The most convenient is the incorporation of the additives into the melted polymer in of blending equipment such as Henschel blender, a Brabender or a Banbury. The melted polymer is then extruded in any shape or can be repelleteed before final extrusion. porous more, Whatever the form of the polymer, the additives can be incorporated in the concentration ranges in which they are normally employed, i.e., 0.1 to 20 weight per cent of the polymer-additive blend, and at uniform concentrations of a single additive in the polymer, or in varying concentration of a single additive in the polymer. If incorporated according to the latter, the concentration of the additive in the polymer varies along the length of the fibre, in respect to the concentration of all additives in the polymer and in varying concentration of one or all additives in the polymer. By such methods, fibres of uniform coloration, as well as fibres of variable and differing colorations along their length, can be produced.

It is within the scope of this invention to add other known antioxidants, UV stabilizers, lubricants, antistatic agents, and the like to the polymer being used.

The following illustrates one embodiment of the invention but is not intended to limit the invention thereto.

Polypropylene pellets, having a melt flow of 12 dg/min. (ASTM D 1238-62T, Condition L) and containing 0.05 php (parts by weight per 100 parts of polymer by weight) Ionol, 0.1 php Irganox 1093, 0.25 php DSTDP, and 0.5 php Tinuvin 328, were blended in a Henschel blender.

Into one portion of the melt, 10 php of the self-polymer of p-($\beta$-hydroxyethoxy)benzoic acid, a disperse dye receptor, were blended.

Into a portion of this melt containing the disperse dye receptor, 1.65 php of Geigy P-2001, a metallizable disperse dye receptor, were blended.

Into a second portion of the melt there were incorporated 1.65 php of Geigy P-2001, a metallizable disperse dye receptor.

Hence there were established three blends, one containing a disperse dye receptor, one containing a metallizable disperse dye receptor and one containing a disperse dye receptor and a metallizable disperse dye receptor.

These blends were individually melt spun into filament yarns and the individual yarns were knitted into individual fabrics. The fabrics were then dyed in a bath containing 0.25 per cent owf (on weight of fabric) of the metallizable disperse dye, Polypropylene Brilliant Blue BM, available from Allied Chemicals, Special Chemicals Division, and 0.5 per cent owf Calcosyn Yellow GCN, a disperse dye, available from American Cyanamid, in a bath containing 2 per cent owf Duponol RA, available from duPont, using a liquid to fabric weight ratio of 40 to 1.

Dyeing was carried out at 205° F. for 1 hour according to conventional methods. The dyed fabrics were afterscoured with a solution containing 2 per cent owf Duponol RA at 130° F. for 20 minutes, and then dried.

The fabric knitted from the first blend was pure even greenish yellow, indicating acceptance of the disperse dye. The fabric knitted from the second blend was a pure even green, indicating acceptance of both dyes. The fabric knitted from the third blend was blue, indicating acceptance of the metallizable disperse dye.

It will be appreciated that a plurality of fibres so treated, each with a different concentration of each of the receptors, or a combination of them, can be employed to produce fabrics of unusual color patterns.

The method of this invention was employed in another instance in the following example.

Polypropylene of the above characteristics was blended with Ionol, Irganox 1093, DSTDP and Tinuvin as described. From the vessel containing this blend, the blend was continuously transferred to a second vessel and the blend from the second vessel was continuously melt spun. While in the second vessel the dye receptors were added to the blend. Addition was of a continuing, but changing nature, in that initially the dye receptor added was all of the disperse dye receptor type. As addition continued, an amount of the metallizable disperse dye receptor was added and over the period, the amount of the metallizable disperse dye receptor being added was increased as the amount of disperse dye receptor being added was decreased so that upon completion of the addition, only metallizable disperse dye receptor was being added.

Hence, there was formed a filament in which the concentration of the two receptors varied along its length. This filament was dyed in the mixed bath previously described, under conventional conditions, to produce a filament varying in color along its length from a yellow green gradually to even green, and thence to blue.

Not only can a fibre be treated according to the method of this invention to produce a fibre varying in color along its length, but any plurality of fibres can be so treated and the combination of fibres can be knitted into fabrics which assume unusual colorations in the subsequent cross-dyeing treatment.

The following is an identification list of trade names employed above which are trademarks:

Ionol - 2,6-di-tert-butyl-4-methylphenol
Irganox 1093 - di-n-octadecyl-3,5-di-tert-butyl-4-hydroxybenzyl phosphonate
DSTDP - distearylthiodipropionate
Tinuvin 328 - 2-(2-hydroxy-3,5-dioctylphenyl)-2,1,3-benzotriazole
Geigy P-2001 - nickel bis-(O-n-butyl-3,5-di-tert-butyl-4-hydroxybenzylphosphonate)
Duponal RA - an alcohol ether sodium sulfate anionic detergent.

It will be appreciated that various modifications can be made to the method of this invention. However, such are believed to be within the scope of the invention.

I claim:

1. A method of producing a dyed propylene polymeric fabric which comprises:
   a. incorporating into a fabric a plurality of modified polymeric fibers, there being incorporated into at least one of said fibers a polymeric disperse dye receptor, there being incorporated into at least one other of said fibers an organometallic metallizable disperse dye receptor and there being incorporated into at least one other of said fibers a polymeric disperse dye receptor and an organometallic metallizable disperse dye receptor; and,
   b. dyeing said fabric with a disperse dye and an organometallic metallizable disperse dye.

2. The method of claim 1 in which said fibers are formed from melted polymer and said dye receptors are incorporated into the melted polymer.

3. The method of claim 1 in which said polymeric disperse dye receptor is selected from the group consisting of poly(ethylene terephthalate), poly[1,3-di(4-piperidyl)propane adipamide], aklylated poly(vinyl pyrrolidone), and the self polymer of p($\beta$-hydroxyethoxy)benzoic acid.

4. The method of claim 1 in which said organometallic metallizable disperse dye receptor is an organonickel compound.

5. The method of claim 4 in which said organonickel compound is nickel bis-(O-n-butyl-3,5-di-tert-butyl-4-hydroxybenzylphosphonate).

6. The method of claim 1 in which said organometallic metallizable disperse dye receptor and said polymeric disperse dye receptor are incorporated into at least one of said fibers in unlike concentrations at various loci along the length of said fiber.

7. The method of claim 1 in which said polymeric disperse dye receptor is selected from the group consisting of poly(ethylene terephthalate), poly[1,3-di-(4-piperidyl)propane adipamide] and an alkylated poly(vinyl pyrrolidone) and said organometallic metallizable disperse dye receptor comprises nickel bis-(O-n-butyl-3,5-di-tert-butyl-4-hydroxybenzylphosphonate).

* * * * *